United States Patent
Séguin

(10) Patent No.: US 6,574,411 B2
(45) Date of Patent: Jun. 3, 2003

(54) BONDING OPTICAL FIBERS TO SUBSTRATES

(75) Inventor: François Séguin, Beaconsfield (CA)

(73) Assignee: ITF Optical Technologies Inc., Ville St-Laurent (CA)

( * ) Notice: Subject to any disclaimer, the term of this patent is extended or adjusted under 35 U.S.C. 154(b) by 0 days.

(21) Appl. No.: 09/937,932

(22) PCT Filed: Jan. 31, 2001

(86) PCT No.: PCT/CA01/00107

§ 371 (c)(1),
(2), (4) Date: Oct. 2, 2001

(87) PCT Pub. No.: WO01/59498

PCT Pub. Date: Aug. 16, 2001

(65) Prior Publication Data

US 2002/0154883 A1 Oct. 24, 2002

(30) Foreign Application Priority Data

Feb. 7, 2000 (CA) .............................................. 2298158

(51) Int. Cl.⁷ ................................................. G02B 6/00
(52) U.S. Cl. ..................................... 385/137; 219/78.01
(58) Field of Search ............................. 385/88–92, 147, 385/50, 49, 14, 15, 137, 83, 80; 219/78.01, 85.13, 85.2, 85.21, 86.9, 87

(56) References Cited

U.S. PATENT DOCUMENTS

| | | | |
|---|---|---|---|
| 4,413,881 A | 11/1983 | Kovats | 350/96 |
| 4,695,125 A | 9/1987 | Sinclair et al. | 350/96 |
| 5,061,035 A | 10/1991 | Rogers, Jr. | 385/115 |
| 5,475,784 A | 12/1995 | Bookbinder et al. | 385/94 |
| 5,500,917 A | 3/1996 | Daniel et al. | 385/99 |
| 5,553,182 A * | 9/1996 | Haake | 385/49 |
| 5,568,585 A * | 10/1996 | Kramer | 385/139 |
| 5,682,453 A | 10/1997 | Daniel et al. | 385/99 |
| 5,796,714 A * | 8/1998 | Chino et al. | 257/84 |
| 2002/0038851 A1 * | 4/2002 | Kajiwara et al. | 250/368 |

* cited by examiner

*Primary Examiner*—Akm E. Ullah
(74) *Attorney, Agent, or Firm*—George J. Primak

(57) ABSTRACT

A method is disclosed for securing an optical fiber to a packaging substrate with a bismuth-containing alloy of solder. For this purpose, the substrate may be provided with metallic pads or a blanket metallization to which the alloy or solder can adhere and the optical fiber is then positioned above such substrate and bonded to it with the alloy or solder. Also, a cavity or recess may be formed in the substrate in which the optical fiber is positioned and into which the alloy or solder is delivered in preformed or liquid state and is solidified in the cavity or recess while bonding the fiber. An optical assembly is also disclosed in which at least one optical fiber is bonded to the substrate by means of the bismuth-containing alloy or solder.

15 Claims, 2 Drawing Sheets

BONDING OPTICAL FIBERS TO SUBSTRATES

BACKGROUND OF THE INVENTION

1. Field of the Invention

This invention relates to a novel method of bonding optical fibers to substrates and to optical assemblies thereby produced.

2. Description of the Prior Art

Optical fibers and various devices made thereof such as couplers, filters and the like must be secured to substrates for packaging purposes. Traditionally this has been done by bonding the fibers to the substrate using polymeric materials such as epoxy adhesives. Such adhesives are usually cured by exposure to heat and/or UV light, which is a precise and time consuming operation and which cannot be reversed in order to readjust or correct a defect in the packaging. Also, epoxies have very different coefficients of thermal expansion relative to the optical fibers and the substrates on which they are mounted, which presents considerable problems when is the devices are subjected to changes in temperature. Moreover, epoxies have a tendency to absorb moisture, which reduces their stability in a moist environment.

Efforts have been made to replace epoxies by other substances, such as metal oxides combined with binder components, as disclosed, for instance, in U.S. Pat. Nos. 5,500,917 and 5,682,453. This requires using intensive energy locally to heat the metal oxides to a temperature at which the binder component burns away and the residual metal-oxide based component drops sufficiently in viscosity so that it flows over and wets the surfaces of the fibers and substrates whereby such elements are bound together upon cooling. This again is a precise and time consuming as well as irreversible operation.

SUMMARY OF THE INVENTION

It has been surprisingly found that optical fibers can be efficiently bonded to a substrate with the use of a bismuth-containing alloy or solder.

Fusible alloys of bismuth-tin are already known For example, in U.S. Pat. No. 4,413,881 such alloy containing 60% tin and 40% bismuth is used to provide a hermetic seal for an optical fiber. In U.S. Pat. No. 5,061,035 a bismuth-tin fluxless solder, amongst others, is used for hermetically sealing an optical fiber array to form a sealed optical fiber bundle. Also, in U.S. Pat. No. 5,568,585 a tin/bismuth solder is mentioned amongst others as being suitable for low temperature hermetic sealing of optical fiber components.

The bismuth-tin alloys or solders have the property of slightly expanding upon solidification as disclosed, for instance, in U.S. Pat. No. 4,695,125, and thus compressing the optical fiber surrounded thereby. Also, they are essentially not subject to creep and deformation during prolonged exposure to elevated temperature or repeated temperature variations.

Such alloy or solder will not directly bond an optical fiber to a flat glass, ceramic or similar substrate since it will not form a chemical or metallurgical bond with the substrate. However, the flat substrate may be provided with metallized areas in appropriate places to which the solder will be metallurgically bonded Such metallized areas may be formed by means of e-beam evaporation, RF sputtering, chemical plating, or the like. Such metallized areas may consist, for instance, of suitable metallic pads or blanket metallization formed on the surface of the substrate layered metal pads formed, for instance, of gold-nickel-titanium layers and the like can be used. Alternatively, the whole of the substrate may be metallized since metal. layers do not require patterning in order to provide a bonding surface for the solder. Similar metallic structures are disclosed, for instance, in U.S. Pat. No. 5,061,035 already mentioned above, where they are used as a solderable metal coating at the end of each optical fiber. In the present case, they are not used to coat the fiber, but to provide a metallized surface on the substrate to which the optical fiber can be bonded.

It is also possible to bond optical fibers to the substrate without providing metallized areas as mentioned above, but by providing a cavity or recess in the substrate in which the fibers are positioned and into which the bismuth-containing alloy, such as the BiSn solder, is introduced in desired spots to bond with the fiber and with the walls of the cavity. Because, as mentioned above, bismuth-containing alloy or solder expands upon solidification, it will expand within and fill the cavity, while compressing against the optical fiber, thereby holding the fiber in place and thus bonding it to the substrate.

The bismuth-containing alloy or solder may be delivered by any suitable means, for instance, by a liquid injection device, or as a preform or may be plated on the substrate, or the like, and it may be heated to a required temperate by any suitable heat source, such as a laser, induction heating, radiant heating or the like. Also an integral source of heat can be created on the substrate by leaving a portion of the base metal exposed and by flowing electrical current therethrough.

The great advantage of the new system is that it is extremely rapid, merely requiring to place a drop of solder over the optical fiber, which solder then rapidly solidifies, and further, if adjustments are subsequently required in the optical assembly, the solder may be softened by heating and then re-solidified once the adjustments have been made.

BRIEF DESCRIPTION OF THE DRAWINGS

The invention will now be described with reference to the appended drawings in which.

DETAILED DESCRIPTION OF THE INVENTION

The figures illustrate preferred but non-limitative embodiments of the invention and the same parts are identified by the same reference numbers in all figures.

Figure 1:
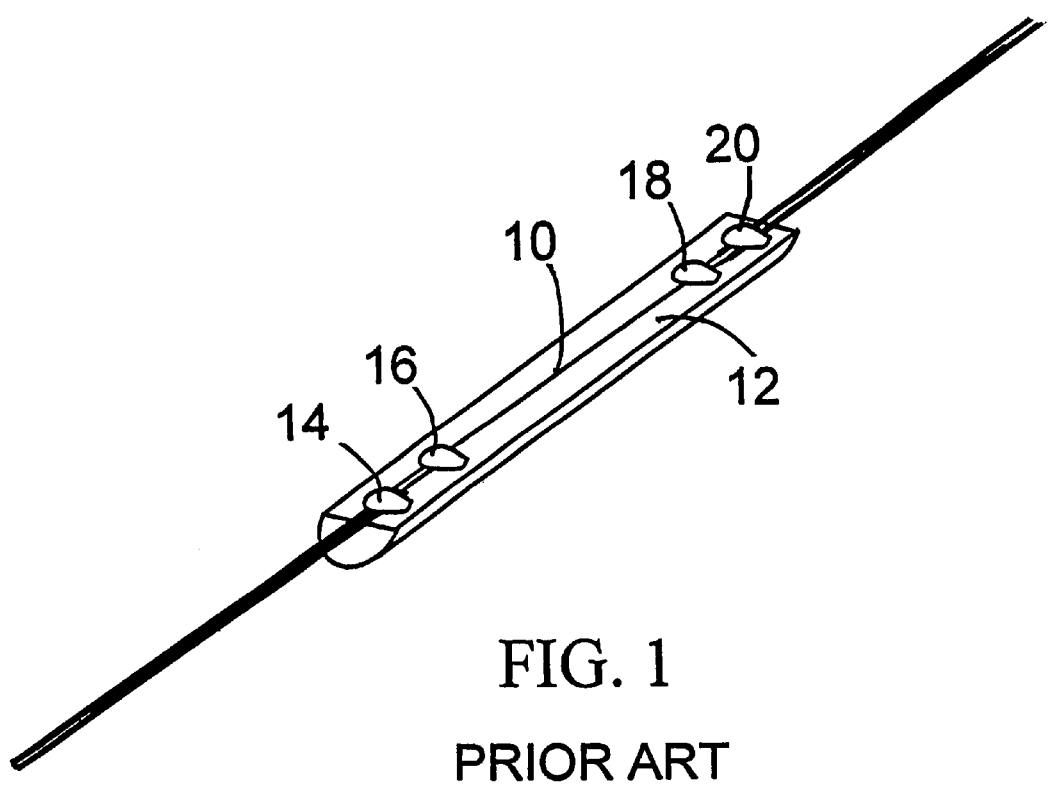
FIG. 1 is a perspective view of a prior art arrangement in which an optical fiber in bonded to an elongated substrate at each end with epoxy adhesive.

FIG. 1 shows a prior art arrangement where an optical fiber 10 is bonded to an elongated substrate element 12 by means of drops of epoxy adhesive 14, 16 and 18, 20 at each end of the substrate element In this case, a packaging of an optical coupler is shown.

Figure 2:
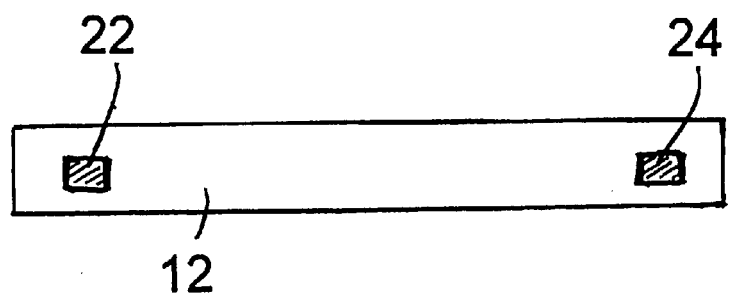
FIG. 2 is a top view of an elongated substrate with a metallic pad secured thereto at each end.

FIG. 2 is a top view of an elongated substrate 12 used in accordance with the present invention and wherein metallic pads 22 and 24 are formed at each end of the substrate element 12.

In this particular case, the attachment of the metallic pads 22, 24 has been done by e-beam evaporation The metallic pads 22, 24 may consist, for example, of layered metallic elements having gold as the top layer. The second layer may be Ni or Pt and the bottom layer may be a Cr layer, a Ti layer or a Ti-W alloy layer which form a good chemical bond to the $SiO_2$ normally contained in the substrate. These are only examples of metalic pads that can be used and any metallic material which can be secured to a glass or other substrate used for packaging of optical fibers and to which the bismuth containing alloy or solder can be bonded, would be suitable. Moreover, as already mentioned, the entire top surface of the substrate element 12 may be subjected to blanket metalization on if desired.

Figure 3:
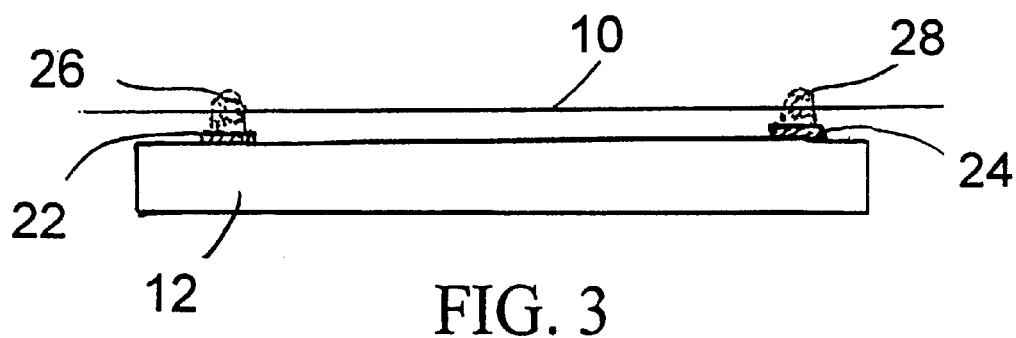
FIG. 3 is a side view of the substrate of FIG. 2, showing the bonding of an optical fiber at each end with a BiSn solder deposited on top of the metallic pads.

FIG. 3 shows a side view of the glass substrate 12 in which, after positioning the optical fiber 10 above the substrate element 12, it is soldered to the metallic pads 22, 24 by means of two drops 26, 28 of BiSn solder. These drops are placed on the metallic pads 22, 24 for instance by means of a liquid injector device after BiSn has been liquified by heating. Drops 26, 28 are so placed that they surround the optical fiber 10 and clamp it at each end of the substrate element 12 while being bonded to the state through attachment to the metallic pads 22, 24 by a metallurgical bond. The solder can also be employed in solid form, for example, in the form of a rectangular preform on each pad 22, 24 and then liquefied by heating, for instance, by means of a laser, by induction heating, by radiant heating, by conductive heating or an integral resistive film heater. A suitable BiSn solder may comprise 30–50% bismuth and 70–50% tin, for instance, 40% Bi and 60% Sn, or 58% Bi 42% Sn, however, other bismuth containing alloys that produce a good connection between the optical fiber and the substrate through the metallic pads or metallized surface, and have an adequate expansion upon solidification and satisfactory creep resistance under operating conditions of the optical assembly so produced, can be used. Thus, for example, addition of indium to the BiSn alloy will improve wetting to glass, but will somewhat reduce creep performance. Consequently a suitable alloy or solder should be selected having regard on the performance requirements of the resulting optical assembly.

Figure 4:
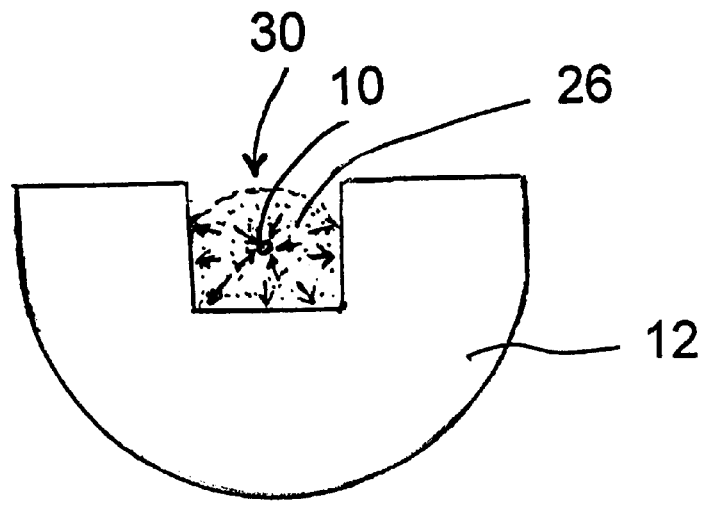
FIG. 4 is an enlarged end view of a substrate having a recess or cavity in the middle of the top surface in which the optical fiber is located and bonded to the substrate.
Figure 5:
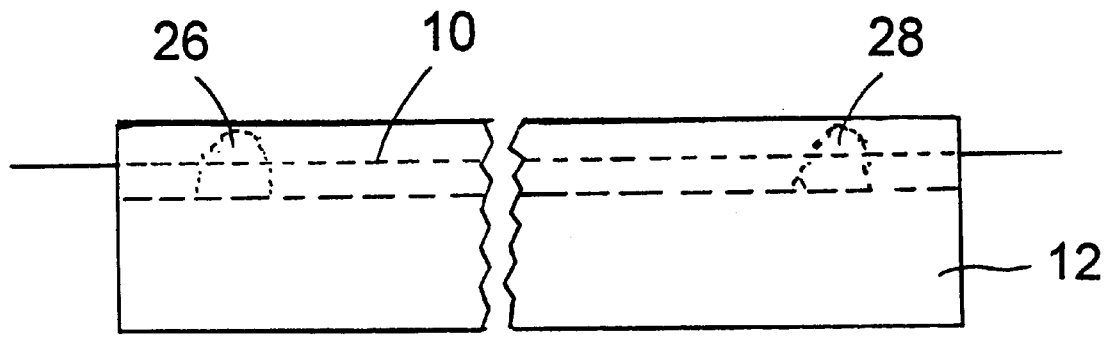
FIG. 5 is a side view of the embodiment shown in FIG. 4.

FIG. 4 illustrates another embodiment of the present invention where in the middle of the substrate 12 there is provided a cavity 30 in which the optical fiber 10 is located. This optical fiber 10 can then be bonded to the substrate 12 by injecting BiSn solder 26 into the cavity 30 and allowing it to solidify therein while encompassing optical fiber 10. This is done at each end of the glass substrate element 12 as shown in FIG. 5 where the second spot of solder 28 is also shown. The arrows within the solder spot 26 in FIG. 4 indicate the expansion of the solder upon solidification allowing its connection to the substrate through pressure exerted thereby against the walls of the cavity 30 and its bonding to the optical fiber 10. If an even stronger connection within cavity 30 is desired, metallization such as shown in FIG. 2 and FIG. 3 can also be provided at the bottom of the cavity 30.

The invention is not limited to the specific embodiments described above but may comprise various modifications obvious to those skilled in the art. For example, this method may be used for bonding more than one optical fiber to the substrate or to bond the optical fiber or fibers in several spots on the substrate or to so bond various optical fiber devices, such as couplers, filters and the like during packaging.

What is claimed is:

1. Method of bonding an optical fiber to a substrate which comprises providing the substrate with means to which can adhere a bismuth-containing alloy or solder which expands upon solidification, positioning the optical fiber above said means and bonding said means and said optical fiber at predetermined spots along the substrate with said alloy or solder.

2. Method according to claim 1, in which said means consist of metallic pads formed on the substrate at predetermined places, to which pads the bismuth-containing alloy or solder can adhere by means of a metallurgical bond.

3. Method according to claim 1, in which said means consist of a metallized surface formed on the substrate, to which the bismuth-containing alloy or solder can adhere by means of a metallurgical bond.

4. Method according to claim 1, in which said means consist of an open cavity or recess formed in the substrate, wherein the bismuth-containing alloy or solder can adhere to the walls of the cavity or recess due to expansion upon solidification, and said optical fiber is positioned above the bottom part of said cavity or recess prior to being bonded.

5. Method according to claim 1, in which the alloy or solder comprises 30–50% of bismuth and 70–50% of tin.

6. Method according to claim 1, in which heating of the alloy or solder during bonding is done by a laser, by induction heating, by radiant heating, by conductive heating or an integral resistive film heater.

7. Method according to claim 1, in which after bonding, the solder can be re-heated and softened to make desired re-adjustments in resulting optical assembly.

8. An optical assembly in which at least one optical fiber is bonded to a substrate provided with means to which can adhere a bismuth-containing alloy or solder which expands upon solidification and exhibits satisfactory creep resistance under operating conditions of the assembly, said optical fiber being positioned above said mean to being bonded by said bismuth-containing alloy or solder.

9. An optical assembly according to claim 8, in which the substrate is provided with metallic pads formed on the substrate at predetermined places, to which pads the bismuth-containing alloy or solder can adhere by means of a metallurgical bond while encompassing the optical fiber positioned thereover.

10. An optical assembly according to claim 9, in which the metallic pads have a layered structure to which the alloy or solder adheres.

11. An optical assembly according to claim 8, in which the substrate is provided with a metallized surface to which the bismuth-containing alloy or solder can adhere by means of a metallurgical bond while encompassing the optical fiber thereover.

12. An optical assembly according to claim 8, in which the substrate is provided with an open cavity or recess wherein the bismuth-containing alloy or solder can adhere to the walls of the cavity or recess due to expansion upon solidification, and the optical fiber is positioned above the bottom part of said cavity or recess prior to being bonded.

13. An optical assembly according to claim 8, in which the substrate is made of glass.

14. An optical assembly according to claim 8, in which the bismuth-containing alloy or solder comprises 30–50% of Bi and 70–50% of Sn.

15. An optical assembly according to claim 8, which is a packaged fiber optic coupler or filter.

* * * * *